Patented Jan. 9, 1923.

1,441,206

UNITED STATES PATENT OFFICE.

JAMES S. BLAIR AND JOSEPH M. BRAHAM, OF WASHINGTON, DISTRICT OF COLUMBIA.

MANUFACTURE OF GUANIDINE SALTS.

No Drawing.  Application filed June 28, 1921.  Serial No. 481,145.

*To all whom it may concern:*

Be it known that we, JAMES S. BLAIR and JOSEPH M. BRAHAM, citizens of the United States, and residents of Washington, D. C., have invented an Improvement in the Manufacture of Guanidine Salts, of which the following is a specification.

The subject of this invention is the manufacture of guanidine salts.

The main object of the invention is the provision of a method of making guanidine salts from cyanamide and ammonium salts and thereby avoiding the steps necessary in the preparation of dicyandiamide.

In the methods thus far proposed the production of guanidine salts from lime-nitrogen has involved the manufacture of dicyandiamide as an intermediate product. The preparation of dicyandiamide from lime-nitrogen involves the extraction of lime-nitrogen with water, the removal of calcium from the extract, the conversion to dicyandiamide and finally the separation of the dicyandiamide from the solution. Having thus obtained dicyandiamide, guanidine salts are prepared from it by hydrolysis with a relatively concentrated acid or by interaction with ammonium salt either in solution or in the dry state by fusion.

We have discovered that guanidine salts may be obtained by heating a solution of cyanamide and an ammonium salt under suitable conditions. In our process, therefore, it is possible to avoid a number of steps in the above procedure by using the cyanamide solution directly. This simplification in the process materially reduces the cost.

In order that our process may be better understood and that it may be more easily differentiated from the prior art the following description of the process is given.

Lime nitrogen is extracted with water and the extract neutralized by preference with a mineral acid. The cyanamide thus liberated is converted to guanidine by autoclaving the solution (i. e. heating under pressure) with an ammonium salt. The guanidine salt is isolated from the solution by fractional crystallization or otherwise, the exact method depending on the particular ammonium salt used.

In carrying out our process we prefer to use sulphuric acid for neutralization. The neutralized solution of cyanamide may be used directly but our experiments have shown that the yields are increased by concentrating the solution. We prefer also to use ammonium nitrate as the ammonium salt in our process since the guanidine nitrate formed from it and cyanamide is easily removed from solution due to its relatively low solubility; furthermore, the ammonium nitrate has a high solubility and consequently does not crystallize out with the guanidine salt. Our experiments have shown that temperatures between 150° and 180° C. are most favorable for the reaction. The time required for the reaction to occur is, of course, dependent on such factors as the concentration, temperature, etc., but in general, a period of approximately three hours is sufficient. Our experiments have shown too that in order to obtain good yields there should be present at least one molecule, but preferably more, of ammonium salt for one molecule of cyanamide. While we have set forth in considerable detail the conditions under which we prefer to carry out our process we do not wish to be limited by the above disclosure except as required by the spirit and scope of the claims.

What we claim and desire to secure by Letters Patent, is:

1. A process for making guanidine salts, comprising extracting lime nitrogen with water, filtering the extract, neutralizing the filtered extract with a mineral acid and autoclaving the solution thus obtained with an ammonium salt.

2. A process for making guanidine salts, comprising extracting lime nitrogen with water, filtering the extract, neutralizing the filtered extract with the mineral acid and autoclaving the solution thus obtained with an ammonium salt in excess of equimolecular proportions.

3. A process for making guanidine salts, comprising extracting lime-nitrogen with water, filtering the extract, neutralizing the filtered extract with a mineral acid with which calcium forms a relatively insoluble salt, filtering off the precipitated calcium salt and autoclaving the filtrate thus obtained with an ammonium salt.

4. A process for making guanidine salts, comprising extracting lime-nitrogen with water, filtering the extract, neutralizing the filtered extract with a mineral acid with which calcium forms a relatively insoluble salt, filtering off the precipitated calcium salt and autoclaving the filtrate thus obtained with an ammonium salt in excess of equi-molecular proportions.

5. A process for making guanidine salts, comprising extracting lime-nitrogen with water, filtering the extract, neutralizing the filtered extract with a mineral acid, concentrating the filtrate, and autoclaving the concentrated solution with an ammonium salt.

6. A process for making guanidine salts, comprising extracting lime nitrogen with water, filtering the extract, neutralizing the filtered extract with a mineral acid, concentrating the filtrate, and autoclaving the concentrated solution with an ammonium salt in excess of equi-molecular proportions.

7. A process for making guanidine salts, comprising extracting lime nitrogen with water, filtering the extract, neutralizing the filtrate with a mineral acid with which calcium forms a relatively insoluble salt, concentrating the filtrate and autoclaving the concentrated filtrate with an ammonium salt.

8. A process for making guanidine salts, comprising extracting lime nitrogen with water, filtering the extract, neutralizing the filtrate with a mineral acid with which calcium forms a relatively insoluble salt, concentrating the filtrate and autoclaving the concentrated filtrate with an ammonium salt in excess of equi-molecular proportions.

JAMES S. BLAIR.
JOSEPH M. BRAHAM.